United States Patent
Bynum et al.

(10) Patent No.: US 9,065,716 B1
(45) Date of Patent: Jun. 23, 2015

(54) CROSS-BAND BROADCASTING

(71) Applicant: Sandia Corporation, Albuquerque, MN (US)

(72) Inventors: Leo Bynum, Albuquerque, NM (US); Mark R. Gramann, Albuquerque, NM (US); Larry D. Bacon, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/077,824

(22) Filed: Nov. 12, 2013

Related U.S. Application Data

(60) Provisional application No. 61/762,041, filed on Feb. 7, 2013.

(51) Int. Cl.
*H04L 25/49* (2006.01)
*H04L 27/26* (2006.01)

(52) U.S. Cl.
CPC .................................. *H04L 27/2637* (2013.01)

(58) Field of Classification Search
CPC . H04L 27/2626; H03F 1/3241; H03F 1/3247; H04B 1/007; H04B 2001/0425; H04B 2001/0433; H04B 1/0475; H04B 1/0483
USPC ................. 375/285, 295–296, 299; 455/63.1, 455/67.13, 91, 101, 114.2, 114.3
See application file for complete search history.

(56) References Cited

U.S. PATENT DOCUMENTS

| | | | | |
|---|---|---|---|---|
| 7,502,357 | B2 * | 3/2009 | Tanada et al. | 370/345 |
| 2002/0039388 | A1 * | 4/2002 | Smart et al. | 375/260 |
| 2006/0291374 | A1 * | 12/2006 | Ahn et al. | 370/210 |
| 2008/0205499 | A1 * | 8/2008 | Ridel et al. | 375/222 |

OTHER PUBLICATIONS

"Digital Modulation in Communication Systems—An Introduction", Application Note 1298, Hewlett® Packard, Copyright 1977, Hewlett-Packard Company, USA (48 pages)—Admitted Prior Art.
Electronics Point Discussion and advise on all things electronic, Re: Multiple FM frequency transmitter, Aug. 12, 2009, Internet @ http://www.electronicspoint.com/re-multiple-fm-frequency-tran . . . (3 pages).
The Straight Dope, Possible to Broadcast on all AM frequencies simultaneously?, Straight Dope Message Board, Dec. 9, 2009, Internet @ http://boards.straightdope.com/sdmb/showthread.php?t=543042 (6 pages).
Tony J. Rouphael, Wireless 101: Peak to average power ratio (PAPR), Design How-to, EE|Times Connecting the Global Electronics Community, Designlines Automotive, Mar. 4, 2009, Internet @ http://www.eetimes.com/document.asp?doc_id=1275672&print=yes (10 pages).
Renaldi Winoto, "Peak-to-Average Power Control in OFDM Systems", EE229B Project, publication date Sep. 16, 2006, 12 pages.
"Direct Digital Synthesizer", Wikipedia, Internet document @ http://enl.wikipedia.org/wiki/Direct_digital_synthesizer, publication date Aug. 17, 2013, 4 pages.

* cited by examiner

*Primary Examiner* — Khanh C Tran
(74) *Attorney, Agent, or Firm* — Daniel J. Jenkins

(57) ABSTRACT

A radio communications device has a modulator that modulates each of a number of different carrier signals with the same message. A combiner combines the modulated carrier signals into a single combined output signal. A radio transmitter receives the single combined output signal and in response simultaneously transmits the modulated carrier signals over the air. Other embodiments are also described.

14 Claims, 5 Drawing Sheets

CROSS-BAND BROADCASTING

CROSS-REFERENCE TO RELATED APPLICATIONS

This application claims the benefit of the earlier filing date of U.S. Provisional Patent Application No. 61/762,041, filed Feb. 7, 2013 entitled "Cross-Band Broadcasting". The aforementioned application is hereby incorporated by reference, in its entirety, for all purposes.

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

The invention is generally related to radio communication systems.

BACKGROUND

Over the air or radio communication systems are used in aircraft and air traffic control towers to provide directions to a pilot and to obtain requests and status information from the pilot. A problem arises, however, when an unexpected aircraft strays into a restricted area, and the local air traffic control tower does not know which radio communications channel the pilot is listening to or tuned in to. A goal here is to alert the pilot as soon as possible about the problem situation. One way to address this problem may be to define an additional channel that all aircraft systems are tuned into, simultaneously with another one of the pilot's choice, that has been adopted by all aircraft systems manufacturers and that is only to be used by an air traffic control tower wishing to immediately alert an approaching aircraft that is in the wrong airspace. In fact, there is an emergency frequency at 121.5 MHz used by aircraft, referred to as "guard" by military pilots. Most aircraft have two radios and military aircraft pilots monitor as a matter of policy this emergency frequency on their second radio while doing most or all of their normal communications on their primary radio. Civilian aircraft are also usually equipped with at least two radios; however, they rarely if ever monitor the 121.5 MHz channel with their second radio. It is a practice that has simply not taken hold in civilian pilot culture.

SUMMARY

An embodiment of the invention is a radio communications device in which a modulator modulates each of a number of different carrier signals with the same message, and combines the modulated carrier signals into a single, combined or total output signal. A radio transmitter receives the combined output signal and in response simultaneously transmits the modulated carrier signals over the air. The message may be a voice message, such as an emergency or warning statement or instruction that is to be heard by a receiver in an aircraft regardless of which particular communications channel the pilot is tuned into. The combined output signal may be in digital form, such that a digital-to-analog converter is then used to convert the single combined output signal into analog form. The carrier signal may be a baseband signal or an intermediate frequency signal, in which case an RF upconverter may be used to receive the analog form of the combined output signal and perform an up conversion into the RF or transmission band. An RF power amplifier then receives the RF or up-converted version and drives an antenna that will radiate the combined output signal over the air. This enables the system to essentially flood all channels of a particular communications band with the same message simultaneously. Note however that one or more selected channels in the band, e.g. "reserved" channels that are not intended for current use, can be omitted for example when generating the carriers.

In one embodiment, the total signal spans an RF range that constitutes essentially an entire communications band whose channels have been assigned by a government agency. As an example, the frequency range may be 118 MHz to 137 MHz, which is the VHF aircraft band that includes more than 700 channels. In this manner, a concurrent radio broadcast can be performed across a range of discrete radio frequencies or channels. Such a radio device can thus communicate with any other radio receiver that is operating on any one of the frequencies or channels in the entire band. The radio device can be used in various situations, not just aircraft safety, where communications is needed with all operators or radios that are operating on any frequency, within a given band. Alternatively, the radio device is useful when communication is needed with a particular individual that is using a radio that is tuned to an unknown frequency (similar to the straying aircraft scenario given above).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The invention may be understood by referring to the following description, and the accompanying drawings, which are used to illustrate various embodiments of the invention. In the drawings.

DETAILED DESCRIPTION

Two issues were raised while assessing the feasibility of simultaneous broadcast on all channels. First, the total effective radiated power (ERP) that is required of the transmitter in a scenario in which there are hundreds of carriers should be reasonable. Second, can a single transmitting RF power amplifier handle the peak power vs. average power requirements of the interaction of that many modulated carriers? The example used to investigate these issues was the one given above, namely the VHF aircraft band which consists of 720 channels, spaced at 25 kHz apart from 118.000 to 135.975 MHz. Communication on these channels uses amplitude modulation (AM). It should, however, be noted that the invention is not limited to those particular numbers. More generally, the cross band broadcasting radio device described here may be used to broadcast a frequency range that constitutes an entire communications band whose channels may have been defined by a government agency, for example, the Federal Communications Commission (FCC) which sets the Airband frequencies and issues station and radio licenses for aircraft use in the U.S., and the International Telecommunications Union (ITU) abroad. Each communications band may be understood to constitute a respective set of assigned, center frequencies, where each channel corresponds to a respective center frequency and has some channel bandwidth. Examples of other communication bands include those assigned to terrestrial police, fire fighting, marine and coastguard communications.

Figure 1:
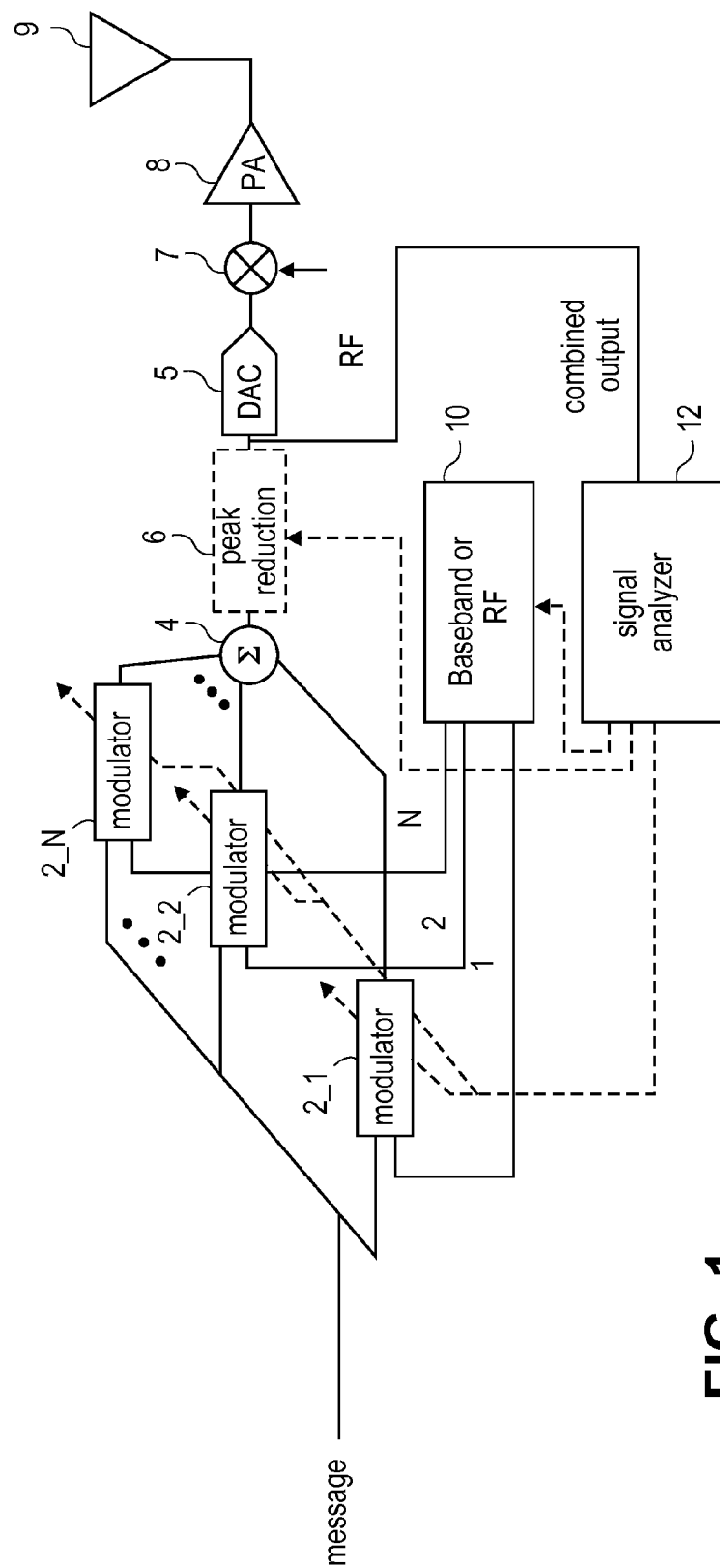
FIG. 1 is a block diagram of a radio communications device in accordance with an embodiment of the invention.

Before presenting the results of an analysis made of the issues above, namely the total ERP and whether a practical transmitting power amplifier can handle the peak power vs. average power requirements of the cross band broadcasting radio device, consider FIG. 1 which is a block diagram of such a radio communications device in accordance with an embodiment of the invention. This is an embodiment of the invention where the message to be broadcast can be modified in real-time during the transmission. In another embodiment of the invention depicted in FIG. 8 and described below, the message is previously determined and fixed, and is stored within non-volatile storage or memory as part of an optimized combined output signal which and can then be repeatedly transmitted by the radio device.

Referring to FIG. 1, a modulator 2 modulates each of a number of different carrier signals 1, 2, ... N where N can be the total number of channels in the communications band of interest, e.g. more than 700 in the VHF aircraft band, in which the message is to be transmitted. Given the rather large number of channels expected in most implementations (one hundred or more), the modulator 2 may be part of a software radio rather than an assembly of hardwired individual units. The outputs of the modulator 2 are combined at a summing junction 4, into a single, combined output, or total signal. In practice, the transmission of the message may be repeated over time, as needed to obtain a reliable indication that the message has been understood by the intended recipient. As suggested above, the message may be a voice message, which may have been recorded or is being generated in real-time, such as emergency or warning speech from an operator of the radio device in real-time. More generally, the message may be an arbitrary message, including any desired data or machine control instruction.

Consistent with the expectation that the modulator 2 will most likely be implemented in software or as a software programmed processor, the combined output signal may be in digital or discrete-time domain format. Accordingly, a digital-to-analog converter (DAC) 5 is provided to convert the signal into analog form. In the case where the carrier signals 1, 2, ... N are generated at baseband, the modulated carriers will then need to be up-converted directly or via an intermediate frequency to the antenna/RF radiation or transmission band, by an RF upconversion stage 7 (depicted using the symbol of a multiplying mixer). It should, however, be noted that in some instances, there may be no need for RF upconversion if the modulator 2 can modulate the carrier signals directly in the radiation band. In both cases, an RF power amplifier (PA) 8 may receive the RF transmission band version of the combined output signal, in analog form, and then drives that signal with power gain into an antenna 9. In other words, a single power amplifier 8 drives an antenna 9 (noting that the antenna 9 may actually be an antenna array subsystem) with a single combined output signal that spans a frequency range that constitutes an entire communications band. In one embodiment, each of the modulated carrier signals is to have a center frequency, and some channel bandwidth assigned or defined by a government agency. In the RF or transmission band, each channel may be defined as encompassing a respective, center RF frequency and some channel bandwidth in which a corresponding RF version of its respective modulated carrier signal is contained.

In one example, the transmission band version of the combined output signal spans the entirety of a communications band in which a number of channels have been assigned by a government agency for "normal" communications, except for a group of one or more reserved channels. As an example, it was pointed out above that the VHF aircraft band consists of 720 channels, and an additional 40 channels are designated for either future use or otherwise reserved and not allowed for normal communications. That band is used for the situation where there is an errant aircraft entering an airspace without authorization, such that that aircraft and its operator need to be hailed and warned immediately without knowing which frequency or channel the operator of that aircraft is tuned to. In other embodiments of the invention, the cross band broadcasting radio device described here can be used for other emergency response or urgent communications that can be broadcast to multiple teams or agencies, using a separate set of frequencies for each team. For example, police officers use different channels from different departments or within the same department. Fire departments and other emergency response teams use a different set of channels than police. Other agencies include the Forest Service, the National Guard, and the Coast Guard. A separate radio device may be adapted for use in each of these bands. In disaster scenarios, where coordinating first responders from a wide range of agencies and organizations is difficult yet needed for improved safety, the radio device described here can be used to efficiently alert a wide range of different emergency response teams simultaneously (and, of course, without requiring any modification to the communications receiver systems used by such personnel). The same radio device can therefore be adapted to perform concurrent broadcasts in multiple bands, provide that the transmitter has the required bandwidth.

In another example, the radio device may be installed within a marine Coast Guard or harbor patrol craft, allowing the operator to easily communicate with other watercraft that may be monitoring unknown frequencies, in order to advise or warn about boundary violations or developing hazards. Furthermore, in a military application, members of the armed forces could communicate with civilian or other military air, land or seaborne craft or personnel on disparate or otherwise unknown frequencies.

In a further embodiment of the invention, the radio device may be used to transmit tactical communications in order to negotiate, confuse, intimidate, interfere with or otherwise influence an enemy or adversarial operator, using radio communications for their own coordination. In a law enforcement scenario, similar to the military and emergency response applications, law enforcement operations could utilize such a radio device and transmitter to broadcast safety information or coordinate communications to other officers or civilians. Such a radio device and transmitter could also be used to supplement hostage or standoff negotiations, or to subvert an organized criminal act that may have been coordinated via radio.

Turning now to the practical issues raised above, and the question of what would be the needed ERP for a typical radio communications transceiver, it has been found that a typical RF transceiver for the VHF aircraft band may have a receiver sensitivity that, along with a typical receiving aircraft antenna, may need about two microVolts RMS amplitude of signal at the input of the receiver, for each channel in the band. This corresponds to power, in a 50-ohm system, of about −101 dBm. If the received antenna power is, for example, 6 dB larger than this, then an 11 dB signal-to-noise ratio is obtained which is considered a reasonably solid signal. Thus, the received power in each channel is about −95 dBm. Using free space propagation, and a center frequency of 127 MHz as just an example, the total transmitter power that is required for cross-band broadcasting is approximately 45 dBm or about 25 Watts. These numbers were computed for a particular example of a ground transmitter with an isotropic antenna, and a receiver in the air that is within a range of between 50 and 60 kilometers. In contrast, performing similar calculations in the case of an air-to-air scenario where the transmitter and the receiver are both in the air, at a range of about 500 meters, then the transmitter power requirements are significantly less. It can be seen that such transmitter power numbers are quite manageable for currently available off the shelf RF power amplifiers.

Turning now to the second issue, the question there is whether with so many carriers operating at once, there are some instants of time that many of them will add constructively thereby producing an unacceptably high peak signal (for the RF power amplifier). Of course, in other instants, some of those carriers will cancel each other and so the net or combined output signal in those instants will be small. Now, if a single RF power amplifier 8 is to be used, as is the case here, the power amplifier will need to accommodate the peaks without clipping or compressing the signal. Clipping may result in undesirable harmonic generation and out of band radiation, as well as distortion of the voice message. Note, however, that unless all of the carrier signals start in phase, it is extremely unlikely that all of the carriers, for example, numbering in the hundreds in the case of the VHF aircraft band, will add constructively. The inquiry here is therefore what is the most likely peak-to-average signal or power ratio that can be expected for the power amplifier.

A brute force simulation approach was taken here to understand the problem of the peak-to-average ratio. First, the RF band carriers were translated to low frequencies (baseband), since the result of the simulation will be the same while the number of samples required to represent the modulated carrier signals at baseband is drastically reduced. The carriers may be normalized for the sake of simulation to, for example, one Volt peak and many be assumed to be generated in a 50-ohm impedance. Note, of course, that the actual numerical values here are immaterial. Thus, considering the VHF aircraft band, the first signal is defined to be a carrier at 118 MHz, and this may be represented by a one Volt DC signal. The second carrier signal is located 25 kHz higher, at 118.025 MHz. This process continues until all of the carriers (in this example 760 carriers) separated by 25 kHz from DC to 760× 25 kHz=19 MHz have been generated. Note that in this case, each of the carrier signals was defined as starting with a random phase. The message used in this example is a constant, namely "one". Thus, the modulated carriers are the same as the generated carriers. The carriers were then added together. The latter represents the function of the summing junction 4 in FIG. 1 that produces the combined output or total signal. The resulting time domain waveform, its statistics, and power spectrum were then computed.

Figure 2:
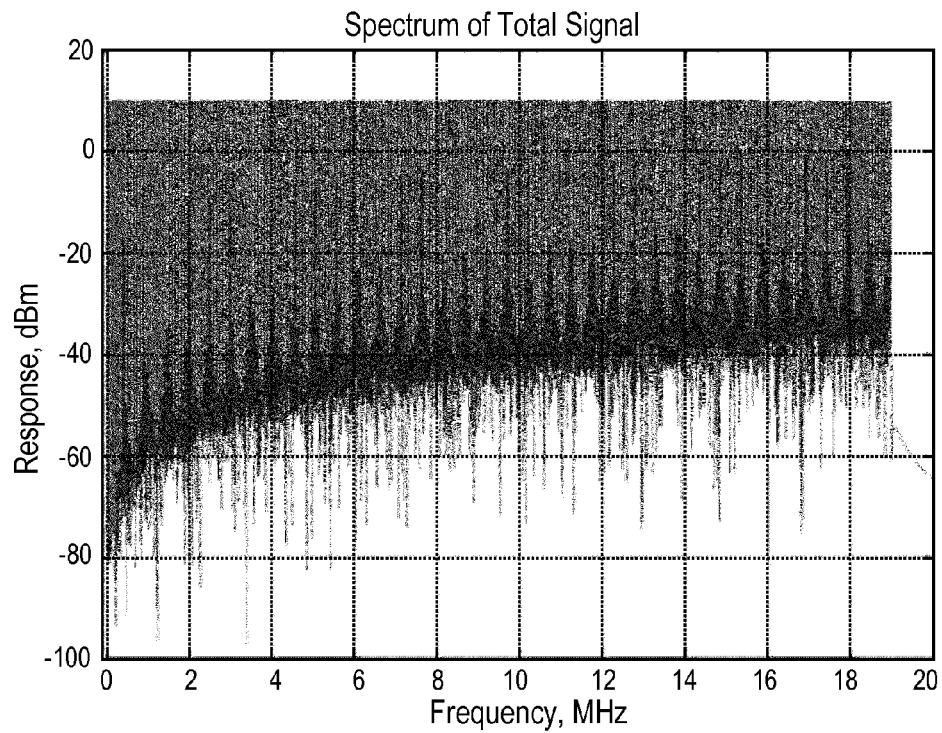
FIG. 2 shows the spectrum of an example combined output signal.
Figure 3:
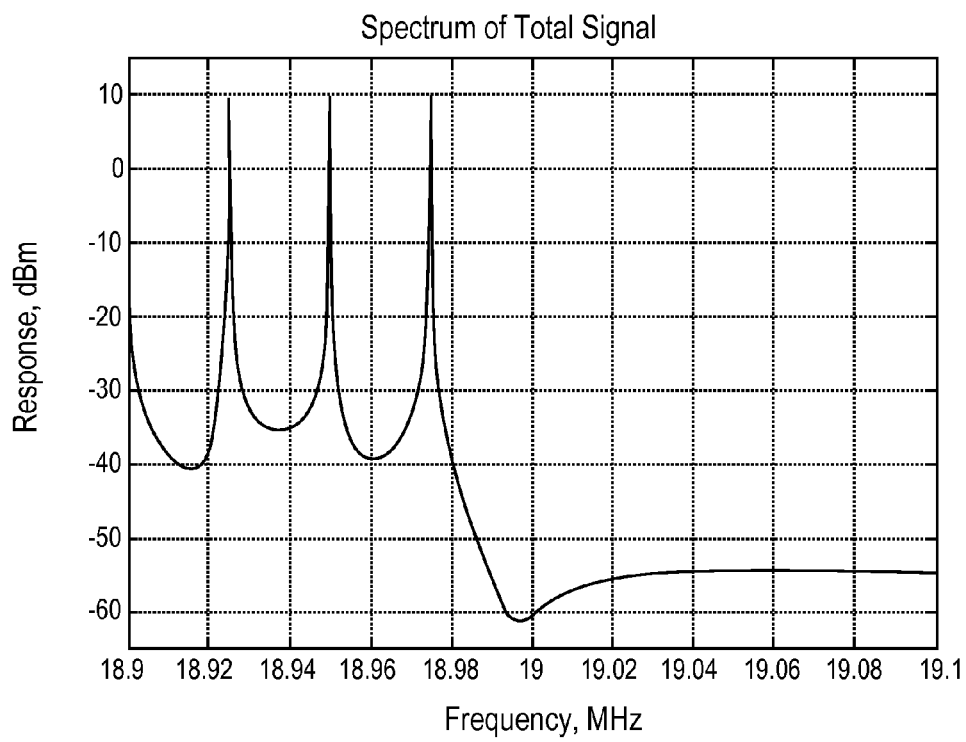
FIG. 3 shows a magnified view of a portion of the spectrum of FIG. 2.
Figure 4:
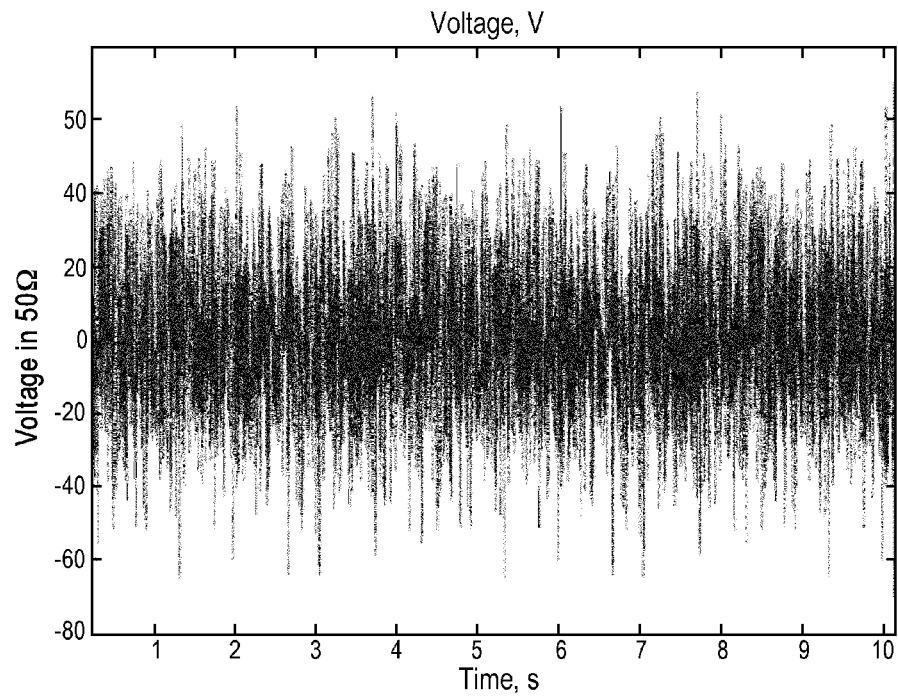
FIG. 4 is a snapshot of the time domain waveform of the example combined output signal of FIG. 2.

FIG. 2 shows the full extent, in this example 19 MHz at baseband, of the magnitude spectrum of the combined carriers. FIG. 3 illustrates a magnified or zoomed in view of the last four carriers showing the 25 kHz spacing and the 10 dBm amplitude of each carrier. This example amplitude value corresponds to a one Volt peak from a 50-ohm impedance, which was the value used when each carrier was generated. Although the carriers were generated in the time domain, their frequency domain spectra as seen in FIGS. 1 and 2 are correct (which serves as a verification on the results on having combined so many carrier signals). FIG. 4 illustrates a snapshot in the time domain of about 100 microseconds of the combined or total signal. As expected, this signal appears to repeat, i.e. it is periodic with a period of 1/(25 kHz) seconds. It can be seen that such a period is $4 \times 10^{-5}$ seconds, and two full periods are shown in the figure, which are the regions between the vertical lines. It can also be appreciated from these computations that a single period of the total or combined output signal (which will repeat) can be predetermined or pre-computed and then stored in a lookup table (assuming the message does not need to change during the broadcast), ready to be immediately transmitted.

Figure 5:
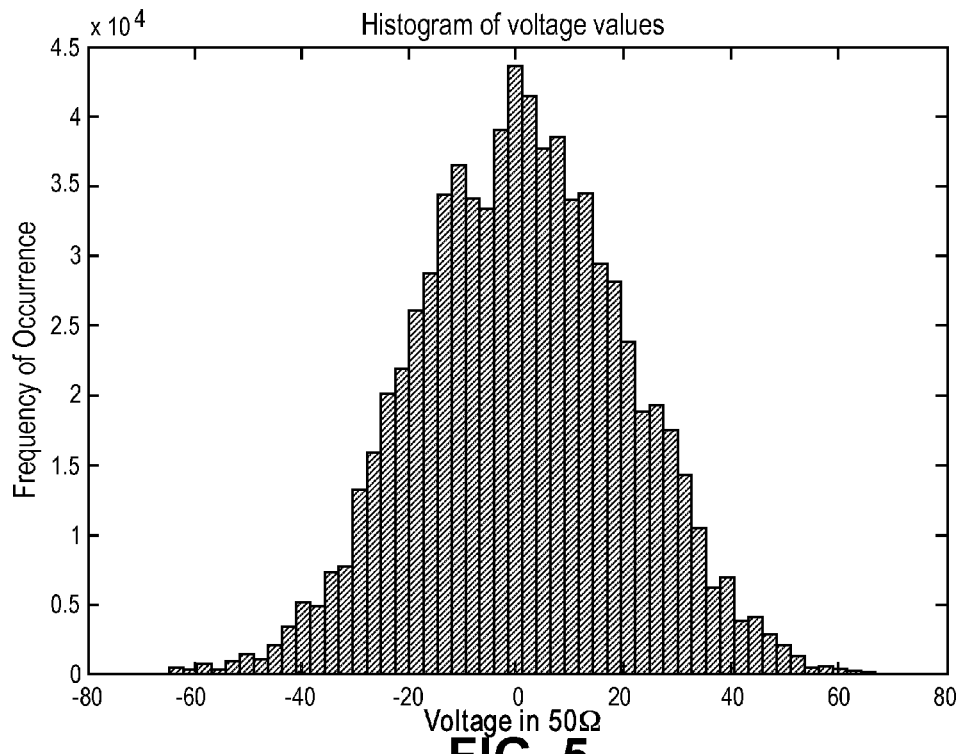
FIG. 5 is a histogram of voltage values contained in the time domain waveform of the combined output signal used in the example above.

Still referring to FIG. 4, it can be seen that while the combined output signal is, in this example, composed of harmonically related sinusoids (albeit with random starting phase), the signal does appear noise like as seen in the time domain snapshot. Its RMS value is measured to be about 19.5 Volts while its peak value is 67 Volts. In this case, these peaks were found to occur so infrequently that some degree of their alteration or distortion (compression) may not be harmful to the intelligibility of a voice message. An RF power amplifier that can drive this type of a signal with reasonable efficiency can be built. The distribution of the amplitudes in the combined output signal of FIG. 4 is shown in the histogram of FIG. 5. It can be seen that signal swings above 50 Volts occur quite infrequently, and hence some level of peak reduction upon the combined output signal may be permissible if needed to reduce the peak to average power ratio at the power amplifier.

While the analysis above was performed upon a "constant" message, the analysis may be extended to a voice message, where the carriers in that case would be modulated with an audio signal or a speech signal representing an operator of the radio device speaking, for example, providing instructions or a warning message to one or more recipients. The analysis should also be performed to evaluate the possibility of using peak reduction and the impact of such distortion on the resulting received signal.

Figure 6:
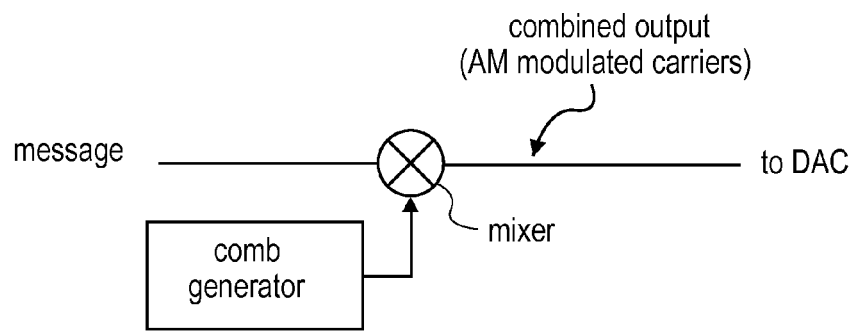
FIG. 6 is a block diagram of another technique for generating the single combined output signal with multiple AM modulated carriers.
Figure 7:
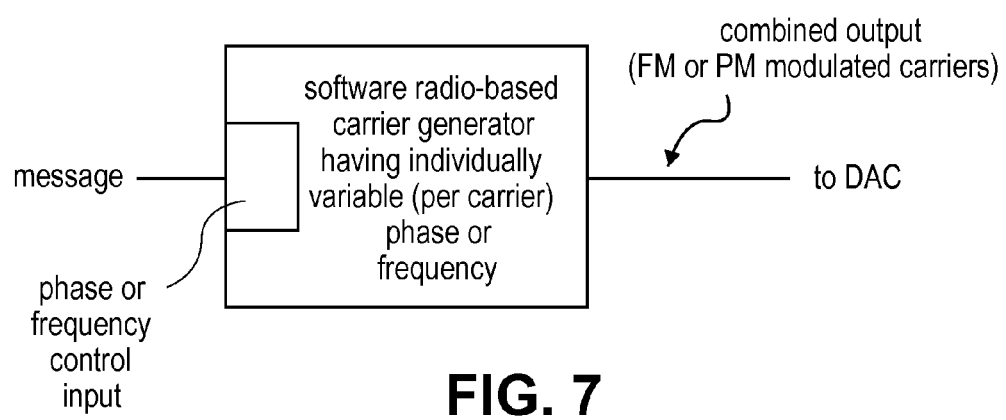
FIG. 7 shows a generalized block diagram of an embodiment of the invention that uses a software radio based multi-carrier generator.

In view of the analysis above, it may be expected that, referring now back to FIG. 1, a carrier generator 10 that produces the different carrier signals 1, 2, . . . N should do so with random phase between the carriers, since this may be sufficient to ensure that the combined output signal (ultimately the analog signal at the output of the DAC 5) exhibits a peak-to-average power ratio that is acceptably low for the power amplifier 8. In general, it is desirable to reduce the peak-to-average ratio of the power amplifier 8 during operation, and as suggested above, this would be achieved if the numerous modulated carrier signals do not peak at the same time. In one embodiment, a comb generator that produces sufficiently random phase shifts between the carrier signals may be used, to produce an AM modulated total signal as shown in FIG. 6. For an FM or PM (phase modulation) embodiment, a software-radio based carrier generator having individually variable (per carrier) phase or frequency may be used whose control input receives the message—see FIG. 7. The carriers with random phases can be generated at baseband and then be later mixed or upconverted to their final RF frequencies. Another approach would be to generate the carriers and add them in the digital or discrete time domain using a field programmable gate array (FPGA) system. The FPGA-based system would implement, for example, a direct digital synthesis (DDS) system which would include the modulator 2, the summing junction 4, and the DAC 5 of FIG. 1.

Referring back to FIG. 1, each modulator $2\_1, 2\_2, \ldots 2\_N$ is to modulate its carrier signal in accordance with phase modulation (PM), frequency modulation (FM), amplitude modulation (AM) or a combination thereof. In a practical solution, the modulator 2 may be implemented as part of a software-programmed processor that produces the modulated carrier signals as digital modulated signals, which can then be combined digitally by the summing junction 4. This approach also enables an embodiment of the invention in which the single combined output signal (at the output of the summing junction 4) can be previously generated and then stored in, for example, a lookup table, e.g. as a single discrete time domain sequence. Alternatively, each of the digital modulated carrier signals may be separately stored (in for example a lookup table) as a separate time domain sequence, and when it becomes necessary to perform a cross band concurrent broadcast of the message, the radio device can simply perform a lookup for each of the modulated carrier signals and then combine them (via the summing junction 4) to produce the single combined output signal. As explained above, it has been found that in some embodiments, the single combined output signal is periodic such that only one period of its waveform is sufficient to be stored in the lookup table.

The problem of ensuring a sufficiently low peak-to-average power ratio for the power amplifier 8 may need a more deterministic solution than simply ensuring random phases between the carriers. An embodiment of the invention enables such a solution by, referring now back to FIG. 1, using a signal analyzer 12 that receives the combined output signal and then processes the signal in order to provide a control signal to the carrier generator that adjusts a phase delay of one or more of modulated carrier signals. This adjustment of carrier phase delay or carrier frequency is one of several techniques described here that can be used to "optimize" the combined output signal in order to achieve a desirably small peak-to-average power ratio for the power amplifier 8. The optional nature of such techniques is indicated by the use of dotted lines in FIG. 1.

Figure 8:
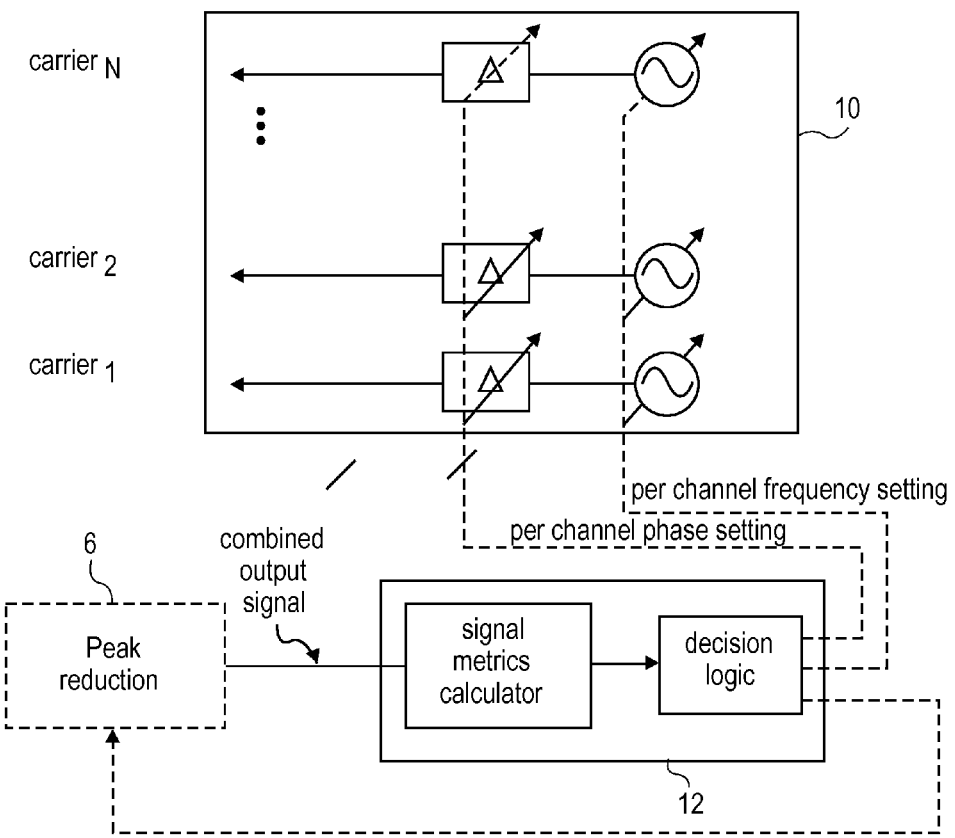
FIG. 8 shows details of the carrier generator and signal analyzer in accordance with an embodiment of the invention.

The phase and/or frequency adjustment capability by the carrier generator 10 is depicted in FIG. 8. The carrier generator 10 here has a per channel frequency setting control input, and/or a per channel phase setting control input, which can be coupled to the output of decision logic in the signal analyzer 12. The decision logic is designed to evaluate one or more signal metrics computed by the signal metric calculator, e.g. a peak-to-average ratio of the combined output signal, and in response cause the phase delay and/or frequency of one or more of the carriers $1, 2, \ldots N$ to be adjusted so as to achieve a desired value for the metric (e.g., a sufficiently small peak to average ratio), thereby resulting in the production of an "optimized" combined output signal. In this way, the carriers (or their respective channels) can be viewed as being slightly offset from each other in phase (based on either a phase adjustment and/or a frequency adjustment) so as to avoid high peaks in the combined output signal. This technique may help ensure a desired peak to average ratio particularly in the case where there are insufficient random offsets in the frequency or phase of the carriers, or in the case where the carrier frequencies are harmonically related to each other.

Note also that the individual adjustments contemplated here to the phase and/or frequency of a carrier are slight; they only need to be sufficient to result in the desired reduction of the peak to average power ratio of the combined output signal. For example, if a frequency adjustment is to be used during transmission of a message, then the adjustment should be no larger than the pull-in range of frequencies of the intended receiver of the message. In other words, this time-varying adjustment of the phase and/or frequency of one or more of the carriers should not exceed the corresponding specification of any of the intended receivers for detecting a received signal.

Still referring to FIG. 1, an alternative to adjusting one or more of the carrier signals' phase and/or frequency (to achieve a desired peak to average power ratio in the combined output signal) is to instruct the modulator 2 to adjust phase delay or amplitude of one or more of the modulated carrier signals, e.g. via adjusting the phase delay and/or amplitude of one or more instances of the message. Another modulator-based approach is to adjust the time delay of several instances of the message—note that this is not technically the same as a phase delay adjustment when the message is not narrowband (unless phase delay varies linearly across frequency within each message instance). The time delay suggested here is small relative to the duration of the message (i.e., not time multiplexing). The control signals that define the adjustments associated with these modulator-based approaches are depicted by a set of dotted lines from the signal analyzer 12 to each modulator $2\_1, 2\_2, \ldots 2\_N$.

Referring now to FIGS. 1 and 8 again, yet another optional adjustment that the signal analyzer 12 can control (to optimize the combined output signal) is to adjust a peak reduction block 6 that is coupled between the combined output signal and the radio transmitter. The peak reduction block 6 may be useful for example when using analog encoding or modulation to produce the modulated carrier signals, as a dynamic range compressor or any suitable filter that reduces or rounds off the peaks of the combined output signal, but without degrading the intelligibility of the voice message at the receiver side. The compressor or filter may also be useful when the message is in digital form and there is digital error correction capability downstream of the peak reduction block 6 to correct for any significant error that may have been introduced by the compressor.

Figure 9:
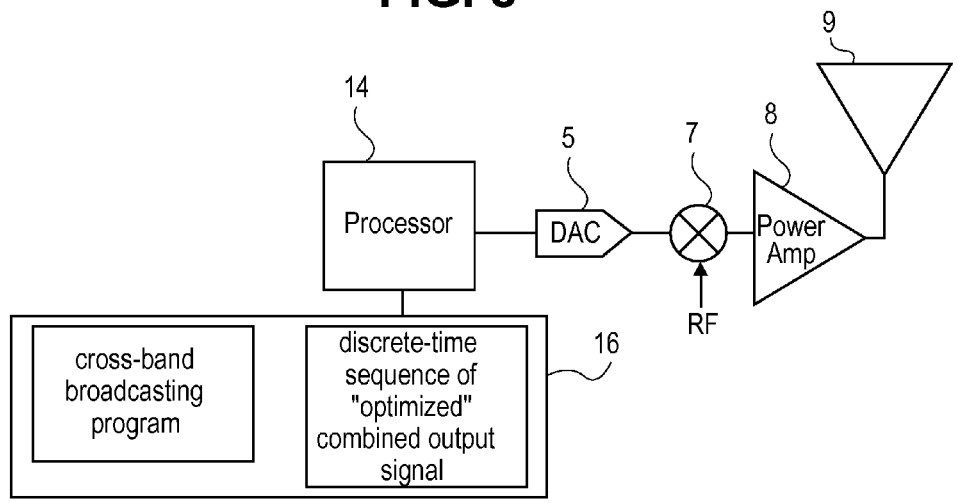
FIG. 9 depicts another embodiment of the invention that uses a previously determined and stored, "optimized" combined output signal.

Turning now to FIG. 9, another embodiment of the invention is shown as a radio communications device that has a memory 16 in which a data structure is stored containing an accumulation of a number of modulated carrier signals, wherein each of the modulated carrier signals is in a different frequency channel and is modulated with the same message. This combined output signal is said to be "optimized" in that its peak to power ratio has been analyzed (e.g., either automatically by the signal analyzer 12 or manually by a human being) and one or more of the carrier (and/or message) phase, frequency or amplitude adjustment techniques described above has been applied to for example reduce the peak to power ration to a desired level. A processor 14 that is coupled to the memory 16 accesses the data structure and in response produces the optimized combined output signal for the DAC 5 to translate into analog form. A radio transmitter (including for example the up-conversion stage 18 followed by the power amplifier 8 and the antenna 9) is to receive and then transmit the analog form of the combined output signal over the air, spanning a frequency range that constitutes an entire communications band whose constituent communication channels have been assigned by a government agency (as explained in more detail above). The data structure in the memory 16 may contain the accumulation of the modulated carrier signals as a single, discrete time domain sequence. Several messages can be prepared in this way and stored in the memory 16, each having its own optimized combined output signal, thereby allowing an operator of the radio device to select the cross band broadcasting of any one of several pre-determined messages.

An embodiment of the invention is a method for radio communications, involving the following operations. Note that in practice, these operations may be performed in a different order than listed below. A number of different carrier signals are produced, each with random starting phase. Each of the carrier signals is modulated with the same message. The modulated carrier signals are combined into a single, digital, combined output signal. Note that if the carriers can inherently be produced with random phase shifts, then there is no need to intentionally perform a randomization operation upon the phase and/or frequency of one or more of the carriers. The combined output signal is to then be transmitted over the air using an RF power amplifier, e.g. optionally including an RF up-conversion operation performed upon the combined output signal. The combined output signal contains the message in each one of all unreserved communication channels that have been assigned by a government agency to a given RF communications band.

As an alternative to ensuring random starting phase, the method may produce the carrier signals without any particular constraint on phase, or the method may require the same starting phase; but in those cases, the combined output signal should be analyzed for example to compute a peak to power ratio (or other suitable signal metric that will be important for efficient operation of the selected RF power amplifier). In response to such analysis, one or more of the following operations may be performed in order to "optimize" the combined output signal. In a first option, the phase delay and/or frequency of one or more of the different carrier signals can be adjusted. In this way, when the modulating and combining operations are repeated upon the phase or frequency adjusted ones of the carrier signals, an "optimized" total signal is produced in which the modulated carriers have been sufficiently offset from each other in time so as to reduce unwanted peaks. In another approach, the phase delay, amplitude or time delay of one or more instances of the message are adjusted during modulation. In yet another approach, the combined output signal is directly altered to reduce the undesired peak levels therein, e.g. manually via user manipulation, or automatically via a dynamic range compression algorithm.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated in the figure to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A radio communications device, comprising:
   a modulator to modulate each of a plurality of different carrier signals with the same message;
   a combiner to combine the modulated plurality of carrier signals into a single combined output signal;
   a radio transmitter to receive the single combined output signal and in response simultaneously transmit the modulated plurality of carrier signals over the air; and
   a peak reduction block coupled between the single combined output signal and the radio transmitter.

2. The device of claim 1 further comprising a digital to analog converter to convert the single combined output signal into analog form,
   and wherein the radio transmitter comprises an RF upconverter to receive the analog form of the combined output signal, an RF power amplifier to receive an RF upconverted version of the combined output signal, and an antenna to receive the RF upconverted version of the combined output signal.

3. The device of claim 2 wherein the RF upconverted version of the combined output signal spans the entirety of a communications band in which a plurality of communication channels have been assigned by a government agency except for one or more reserved channels.

4. The device of claim 2 wherein the RF upconverted version of the combined output signal spans a frequency range of 118 MHz to 137 MHz and more than 700 channels in that frequency range.

5. The device of claim 1 wherein the modulator comprises a software-programmed processor that is to produce the modulated plurality of carrier signals as a plurality of digital modulated carrier signals, respectively.

6. The device of claim 1 further comprising:
   a carrier generator to produce the plurality of different carrier signals; and
   a signal analyzer to receive the combined output signal and to provide a control signal to the carrier generator that adjusts one of phase delay and frequency of one or more of the produced plurality of different carrier signals.

7. The device of claim 1 further comprising:
   a signal analyzer to receive the combined output signal and to provide a control signal to the modulator that adjusts one of phase delay, amplitude and time delay of one or more instances of the message.

8. The device of claim 1 further comprising a signal analyzer to receive the combined output signal and to provide a control signal to the peak reduction block.

9. A method for radio communications, comprising:
   producing a plurality of different carrier signals each with random starting phase;
   modulating each of the plurality of different carrier signals with the same message; and
   combining the modulated carrier signals into a single, digital, combined output signal; and
   analyzing the digital combined output signal and in response altering the combined output signal to reduce peak levels therein.

10. The method of claim 9 further comprising:
    converting the combined output signal into analog form;
    frequency upconverting the analog form of the combined output signal; and
    transmitting over-the-air the frequency upconverted form of the combined output signal.

11. The method of claim 10 wherein the frequency upconverted form of the combined output signal contains the message in each one of all unreserved communication channels that have been assigned by a government agency to a given RF communications band.

12. The method of claim 9 further comprising
    analyzing the combined output signal, and in response adjusting one of a) phase delay and b) frequency of one or more of the plurality of different carrier signals, prior to repeating said modulating operation upon the phase or frequency adjusted one of the carrier signals and then repeating said combining operation.

13. The method of claim 9 further comprising:
    analyzing the combined output signal, and in response adjusting one of a) phase delay, b) amplitude, and c) time delay of one or more instances of the message during the modulating operation, prior to repeating said combining operation upon the adjusted one of the modulated carrier signals.

14. The method of claim 9 wherein analyzing the digital combined output signal comprises computing a peak to average ratio of the signal.

\* \* \* \* \*